United States Patent Office 2,768,130
Patented Oct. 23, 1956

2,768,130

ADDITION OF OXO BOTTOMS TO AN ACID SLUDGE FOR STABILIZATION AND PUMPING EASE

Herschel T. White, Elizabeth, N. J., assignor to Esso Research and Engineering Company, a corporation of Delaware No Drawing. Application July 21, 1955, Serial No. 523,623

4 Claims. (Cl. 196—148)

This invention relates to improvements in the storing of acid sludge and in particular to the improvement in storing and shipping acid sludge for subsequent handling through a pumping system.

In the refining of petroleum oils to produce, for example lubricating oils, white oils, and technical oils having viscosities ranging from below 50 to over 1000 SSU at 100° F., the oil is subjected to treatment with strong sulfuric acid, generally of a strength in the range of 93% sulfuric acid to about 107% sulfuric acid, the latter being commonly known as fuming sulfuric acid or oleum. The acid sludge resulting from the treatment of these oils with strong sulfuric acid is separated from the treated oils and is generally stored for subsequent treatment. This treatment may be the recovery of the sulfuric acid from the sludge by a process known as "cooking" wherein the sludge is diluted with water, cooked, and allowed to stratify into a tar layer and a lower weak acid layer; or, a sludge coking process may be employed where the sludge is thermally decomposed and the liberated sulfur-bearing gases are subsequently converted into fresh sulfuric acid. Depending upon the type of oil treated and the amount and strength of the sulfuric acid employed, the acid sludge will vary in composition from 10 to 90 plus percent acid and from a very fluid and pumpable sludge (about 600 centipoises at 40° C.) to a viscous, almost semi-solid sludge which is pumpable only with great difficulty.

Refinery experience has shown that the most difficult sludges to store and handle are those obtained in the production of the more viscous or "heavy" white oils, during which time a petroleum distillate of 500–900 SSU viscosity at 100° F. is treated with large volumes of fuming $H_2SO_4$. Some of the sludges are almost granular in nature, having small lumps of polymerized and carbonized materials suspended throughout; others are entirely homogeneous. Accordingly, it is well established practice to modify the consistency of these sludges to facilitate the handling thereof through the existing pumping systems by blending the more fluid sludges with the more viscous after separation from the treating units. Dilute sulfuric acid and various organic fluidizers such as petroleum phenols are also added when the degree of sludge blending is insufficient to yield a sludge of sufficiently low viscosity for easy handling. However, once these sludges, diluted or undiluted, are stored it has been found that they tend to increase markedly in viscosity even to the point of solidifying due to the formation of coke and polymers. This polymerization may be considered as due to two main effects; the first is the continuing "working" of the residual acid in the sludge on the more slowly reactive material; the second is that of oxidation due to the adsorption of oxygen from the air. This solidification during storage is a particularly serious problem when it is desired or necessary to ship the sludge by tanker or tank car from one location to another. Experience has shown that in many cases the sludge could not be pumped out of the containers upon arrival and had to be returned to the point of origin for disposal.

It is, therefore, the primary object of this invention to store and ship acid sludges under conditions which reduce their tendency to increase in viscosity and/or solidity.

It is another object of the invention to provide an efficient and economical method of storing and shipping acid sludges whereby their pumpability characteristics are maintained.

Other objects and advantages of the invention will become apparent from the following description thereof.

It has now been found that acid sludges, and in particular those derived from the treatment of white oil stocks with fuming sulfuric acid, may be stabilized against sedimentation, coke formation and solidification, and kept in a fluid and pumpable condition by blending with the sludge, preferably as soon as it has been separated from the treated oil, from 0.3–10% by weight of Oxo bottoms.

The Oxo bottoms product is produced by what is now the well-known process for producing Oxo alcohols, that is, primary alcohols having from 3 to 20 and higher carbon atoms. In the first stage of the Oxo synthesis, an olefinic material, a cobalt carbonylation catalyst, and CO and $H_2$ are reacted at pressures of about 1500–4500 p. s. i. g. and temperatures of 275–375° F. to give a product consisting primarily of aldehydes having one more carbon atoms than the olefins in the feed. In the second stage, the crude aldehyde product is hydrogenated to give a mixture of alcohols from which the desired Oxo alcohols are recovered by distillation. The distillation residue is denominated "Oxo Bottoms."

In a process for the manufacture of iso-octyl alcohol by a two-stage Oxo process using a predominantly $C_7$ olefinic feed, the final distillation of the crude $C_8$ alcohol product results in a bottoms fraction representing about 15–30% of the crude alcohol charge to the distillation zone. This bottom fraction consists of some $C_8$ and $C_9$ alcohols, as well as $C_{15}$—$C_{16}$ alcohols, $C_{24}$ acetals and $C_{16}$ ethers. Of these constituents, the $C_8$ alcohols represent the final traces (1–5%) remaining in the bottoms from the distillation of the main product. The remaining so-called bottoms consists primarily of higher boiling oxygenated compounds formed by side reactions occurring in either the first or second stage of the $C_8$ alcohol process. As clear as can be determined by chemical analysis and infra-red absorption spectographic study, these constituents have been identified as $C_{15}$ secondary alcohols, $C_{15}$ aldehydes or ketones, $C_{24}$ acetals, the $C_{22}$ ester of $C_{14}$ naphthenic acids used in making the cobalt catalyst used in the first or oxonation stage, and saturated and unsaturated $C_{16}$ ethers. A typical chemical analysis of the higher boiling oxygenated bottoms fraction obtained from a commercial oxonation process, substantially free from $C_8$—$C_9$ alcohol fractions, is shown in Table I. The hydroxyl number, free and combined carbonyl numbers, and saponification and acid numbers are expressed in terms of milligrams of potassium hydroxide per gram of sample analyzed.

TABLE I
*Typical composition of the Oxo alcohol bottoms*

| Inspection Tests | | Constituents | Percent By Weight |
|---|---|---|---|
| Hydroxyl No | 95 | $C_{15}$–$C_{16}$ alcohol | 48.6 |
| Free Carbonyl No | 0.5 | $C_{15}$–$C_{16}$ aldehyde or ketone | 0.2 |
| Combined Carbonyl No | 29 | $C_{24}$ acetal | 19.1 |
| Saponification No | 21 | $C_{22}$ (octyl naphthenate ester) | 14.7 |
| Gravity, °API | 33.3 | | |
| Acid No | 0.2 | Saturated $C_{16}$ ether (dioctyl ether).[1] | 17.4 |

[1] Calculated by difference.

Analytical results obtained by chemical and infra-red methods appear to be in essentially good agreement as indicated by their comparison in Table II below:

TABLE II

*Comparison of analyses of Oxo alcohol bottoms*

| | Chemical Method | Infra-Red Method |
|---|---|---|
| $C_{15}$–$C_{18}$ Alcohols, percent | 48.6 | 43 |
| $C_{15}$–$C_{18}$ Ketones, percent | 0.2 | 4 |
| $C_{22}$ Ester, percent | 14.7 | 13 |
| Acetal, percent | 19.1 | 9 |
| Acid, percent | Trace | |
| Saturated $C_{18}$ Ether, percent | 17.4 | 27 |
| Unsaturated $C_{18}$ Ether, percent | | 3 |

It can thus be readily seen that the synthetic Oxo process gives complex mixtures of compounds having various carbon structures in the molecules and having varied molecular weights. (As to the complex nature of these products, see United States Bureau of Mines Publication, R. I. 4270, "Critical Review of Chemistry of Oxo Synthesis, etc.," June 1948.)

The bottoms product from an Oxo process employing a $C_7$ olefin feed is substantially free of $C_8$ alcohols and boils in the range of about 190° C. to about 18 weight percent, boiling above 395° C.

It is to be understood that whenever the term "Oxo Bottoms" is used in the specification, it indicates a still-bottoms product produced by the indicated two-stage operation.

Thus, in accordance with the present invention, acid sludges, and in particular white oil sludges, are stabilized by the addition of 0,3–10% of Oxo bottoms. Preferably the bottoms from a $C_8$–$C_{10}$ Oxo alcohol production are used, though bottoms from $C_4$–$C_{18}$ alcohol production are suitable.

The following data illustrate the advantages to be obtained according to the present invention.

EXAMPLE 1.—SLUDGE AND OXO BOTTOMS BLENDED MANUALLY: EXPOSED FOR 5 DAYS IN EVAPORATING DISH WITH OCCASIONAL STIRRING

| | Tar Layer, Vol. Percent | |
|---|---|---|
| | On Sludge | Relative |
| Control (sludge only) | ca. 50 | 1.0 |
| +2% Oxo Bottoms | ca. 20 | 0.4 |
| +5% Oxo Bottoms | <10 | <0.2 |

EXAMPLE 2.—SLUDGE AND OXO BOTTOMS STIRRED (100 R. P. M.) FOR 4 DAYS IN AN $SO_2$ ATMOSPHERE FOLLOWED BY EXPOSURE TO AIR FOR 3 DAYS WITH OCCASIONAL STIRRING

| | Tar Layer, Vol. Percent | |
|---|---|---|
| | On Sludge | Relative |
| Control (sludge only) | 22 | 1.0 |
| +0.3% Oxo Bottoms | 4 | 0.2 |
| +1.0% Oxo Bottoms | 3 | 0.1 |

Both sets of data illustrate graphically the inhibitory effect of Oxo Bottoms on sludge stratification.

EXAMPLE 3

To show the superior stabilizing activity of Oxo bottoms over high potency emulsifying agents such as oleic acid, the following data are illustrative. These data show the comparative increase of sludge viscosity with no stabilizer added, with 1% oleic acid, and with 1% Oxo bottoms.

*Sludge stabilization data*

[Viscosity expressed as seconds/100 revolutions as determined on a Stormer Viscosimeter with 1025 gm. wt. at 75° F.]

| Exposure Time, Days | Control | +1% Oleic Acid, U. S. P. | +1% Oxo Bottoms |
|---|---|---|---|
| 0 | 60–61 | 60–61 | 60–61 |
| 7 days, covered | 100 | | 65 |
| +2 additional days, open to air | 1,029 | 281 | 216 |
| 9 days' total exposure time. | | | |

The superiority of Oxo bottoms over conventional and high potency emulsifying agents may in part be due to the fact that some of the constitutents of the bottoms product act as anti-oxidants. The increase in sludge viscosity, as has been pointed out, is due to at least two causes, namely, as a result of progressive polymerization, and also, oxidation of the sludge tar. Particularly at summertime storage tank, or tank car temperatures, sulfuric acid oxidation or dehydrogenation of the sludge tar results in coking. The anti-oxidants in Oxo bottoms inhibit this type of oxidation whereas oleic acid, acting as an emulsifier only, has essentially no inhibitory effect.

EXAMPLE 4

A tank car containing 4961 gallons of acid sludge derived from treating a heavy white oil distillate with fuming sulfuric acid, and containing 1.66 vol. percent of Oxo bottoms was shipped 1800 miles. The total elapsed time from filling of the car until arrival at its destination was approximately 10–12 days. Inspection of the tank car on arrival revealed a one inch layer of light oil, two inches of scum immediately underneath, followed by 43½ inches of stablized fluid sludge.

This sludge was readily pumpable. Two previous tank car shipments of sludge obtained from treating a somewhat lighter white oil distillate, but without the addition of Oxo bottoms stabilizer, contained about 24 inches of viscous, unpumpable tar.

What is claimed is:

1. In a process for refining petroleum oil, the steps which comprise separating an acid sludge which is to be stored for a period of time and has been produced by treating a petroleum oil with concentrated sulfuric acid, and admixing therewith from about 0.3 to about 10% by weight of Oxo bottoms whereby said sludge is stabilized.

2. The process of claim 1 wherein said petroleum oil is a white oil distillate.

3. The process of claim 1 wherein said acid is fuming sulfuric acid.

4. The process of claim 1 wherein said sludge is derived from the treatment of a white oil distillate having a viscosity of about 500–900 SSU at 100° F.

References Cited in the file of this patent

UNITED STATES PATENTS 2,418,784  McCormick et al. _____ Apr. 8, 1947

FOREIGN PATENTS 67,931  Netherlands _____ May 15, 1951